United States Patent [19]

Ootsuka et al.

[11] Patent Number: 4,734,730
[45] Date of Patent: Mar. 29, 1988

[54] AUTOMATIC FOCUS DETECTING CAMERA

[75] Inventors: Hiroshi Ootsuka, Sakai; Nobuyuki Taniguchi, Nishinomiya; Akihiko Fujino, Sakai, all of Japan

[73] Assignee: Minolta Camera Kabushiki Kaisha, Osaka, Japan

[21] Appl. No.: 906,829

[22] Filed: Sep. 12, 1986

[30] Foreign Application Priority Data

Sep. 17, 1985 [JP] Japan .................. 60-204994
Sep. 30, 1985 [JP] Japan .................. 60-218767

[51] Int. Cl.⁴ .................. G03B 3/00; G03B 7/00; G03B 17/38
[52] U.S. Cl. .................. 354/402; 354/446; 354/266
[58] Field of Search .......... 354/400, 402, 408, 412, 354/195.12, 446, 266, 237, 272, 270, 271.1

[56] References Cited

U.S. PATENT DOCUMENTS

Re. 31,370  9/1983  Mashimo et al. .......... 354/412 X
4,387,975  6/1983  Araki .................. 354/407 X

FOREIGN PATENT DOCUMENTS 57-124330  8/1982  Japan .

Primary Examiner—W. B. Perkey
Attorney, Agent, or Firm—Watson, Cole, Grindle & Watson

[57] ABSTRACT

In an automatic focus detecting camera of the present invention, a light measuring circuit performs light measuring operation when a light measuring switch is closed, so that an automatic focus controller performs automatic focus detecting and controlling operation. If an in-focus condition is detected by the automatic focus controller when a preview switch is operated, preview control is started. If an in-focus condition is not detected, preview control is forbidden. Thus, automatic focus detecting operation and preview operation can be performed independent of a prescribed aperture value.

18 Claims, 18 Drawing Figures

AUTOMATIC FOCUS DETECTING CAMERA

BACKGROUND OF THE INVENTION

1. Field of the Invention

The present invention relates to an automatic focus detecting camera. More particularly, the present invention relates to an automatic focus detecting camera of a single-lens reflex type capable of performing preview operation to allow a photographer to see an image in a finder by stopping down an aperture diaphragm to a predetermined aperture value so that he can directly know an actual depth of field when the aperture diaphragm is stopped down to the predetermined aperture value.

2. Description of the Prior Art

There are various automatic focus detecting systems. As an example, there is known an automatic focus detecting apparatus of a system for detecting a focusing position of an objective lens by the overlap of images of the same portion of an object caused by light rays passing through two portions of an exit pupil of the objective lens both of which are symmetrical with regard to the optical axis of the objective lens. In such an automatic focus detecting apparatus, a portion contributing to focus detection in the objective lens is caused to be covered by the aperture diaphragm if the diaphragm is stopped down to a certain extent.

As a result, automatic focus detection can not be made if the aperture diaphragm is stopped down exceedingly.

Therefore, in an "Automatic Focusing Position Detecting Apparatus" disclosed in U.S. Pat. No. 4,387,975, focus detection is interrupted at the time of preview operation because shading is caused in the incident light applied to the light receiving elements when the diaphragm is stopped down by the preview operation in a focus detection optical system of an exit pupil divisional type. In addition, in a single-lens reflex camera disclosed in Japanese Patent Laying-Open Gazette No. 124330/1982, focus detection is stopped at the time of preview operation and the state of focus detection before the preview operation is maintained during the preview operation. Those prior art techniques intend to avoid occurrence of erroneous focus detection which would be caused by automatic focus detection effected in spite of the state where focus detection can not be made, and which would result in a photograph out of focus if the photograph were taken under that condition. Those prior art systems make it possible to prevent a photograph from being taken out of focus because a image to be photographed is previewed if a desired aperture value corresponds to a diameter smaller than a certain limit value. However, focusing operation needs to be made manually at the time of preview operation in those prior art systems and accordingly the essential feature as an automatic focus detecting camera is lost by such preview operation.

SUMMARY OF THE INVENTION

Therefore, a primary object of the present invention is to provide an automatic focus detecting camera capable of making preview operation without limiting an automatic focus detecting function.

Briefly stated, the present invention operates by using operating members in the following manner. Prior to a photographing operation, an aperture diaphragm of an objective lens is stopped down in response to a first aperture signal indicative of a value set by aperture value determining means, and the value of the first aperture signal and a value of a second aperture signal set in advance are compared. If the value of the first aperture signal is equal to or smaller than the value of the second aperture signal, automatic focus detecting means is enabled to make focus detection. If the value of the first aperture signal is larger than the value of the second aperture signal, focus detection is suppressed.

Consequently, according to the present invention, automatic focus detection or preview operation is suppressed less frequently than in a conventional camera at the time of preview operation.

In a more preferred embodiment of the invention, focus detection by automatic focus detecting means is forbidden if the value of the first aperture signal is larger than the value of the second aperture signal.

In a further preferred embodiment of the invention, operation of shutter releasing means is forbidden until an in-focus state is established in case where focus detection is made and, operation of the shutter releasing means is allowed irrespective of detection of a focus in case where focus detection is not performed.

According to another aspect of the invention, in order to preview an image with a aperture value exceeding a limit value permissible for automatic focus detection, the aperture diaphragm of an objective lens is stopped down to the limit value permissible for automatic focus detection and if the aperture value does not exceed the limit value for automatic focus detection, both preview operation and automatic focus detecting operation are permitted.

In addition, according to a further aspect of the invention, the aperture diaphragm of the objective lens is stopped down to a determined aperture value after automatic focus detecting operation has been performed.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 14 is a flow chart for explaining operation of a fifth embodiment of the present invention.

DESCRIPTION OF THE PREFERRED EMBODIMENTS

Figure 1:
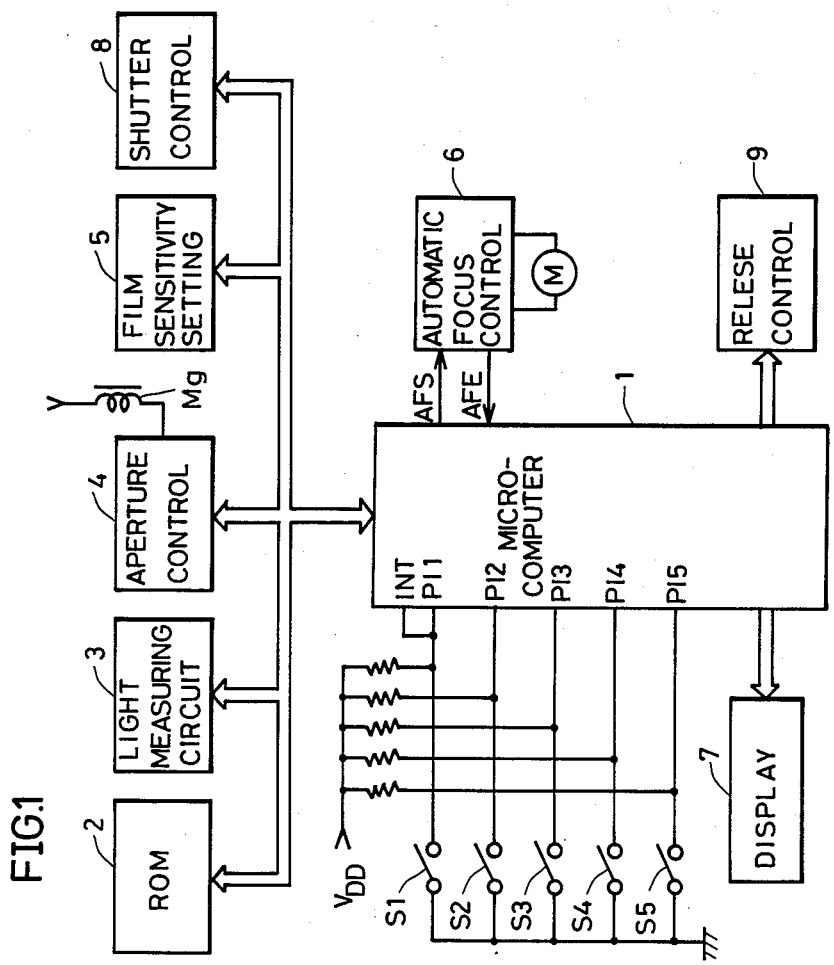
FIG. 1 is a schematic block diagram of a first embodiment of the present invention.

FIG. 1 is a schematic block diagram of a first embodiment of the present invention. First referring to FIG. 1, a construction of the first embodiment of the present invention will be described. A microcomputer 1 controls the whole body of a camera. The microcomputer 1 is connected with a ROM2, a light measuring circuit 3, an aperture control portion 4, a film sensitivity setting portion 5 and a shutter control portion 8. The ROM2 is contained in an interchangeable lens and stores information of the interchangeable lens such as a minimum aperture value or a maximum aperture value of the minimum diameter. The light measuring circuit 3 measures brightness of an object. The aperture control portion 4 regulates the aperture diaphragm of the interchangeable lens and controls an aperture control magnet Mg to make the aperture diaphragm to a predetermined aperture value at the time of preview operation and exposure operation. The film sensitivity setting portion 5 sets sensitivity of a film and the shutter control portion 8 controls opening and closing of a shutter.

The microcomputer 1 is further connected with an automatic focus control portion 6, a display portion 7 and a shutter release control portion 9. The automatic focus control portion 6 detects the focusing condition of the lens in response to an automatic focus detection start signal AFS supplied from a port PO1 of the microcomputer 1 and drives a motor M based on the detected result so that the lens is brought into an in-focus position. The automatic focus control portion 6 supplies an automatic focus detection end signal AFE to a port P16 of the microcomputer 1 when the lens is in an in-focus condition. The display portion 7 displays photographing information such as an aperture value and a shutter speed based on data provided from the microcomputer 1. The release control portion 9 controls releasing of the shutter.

Figure 17:
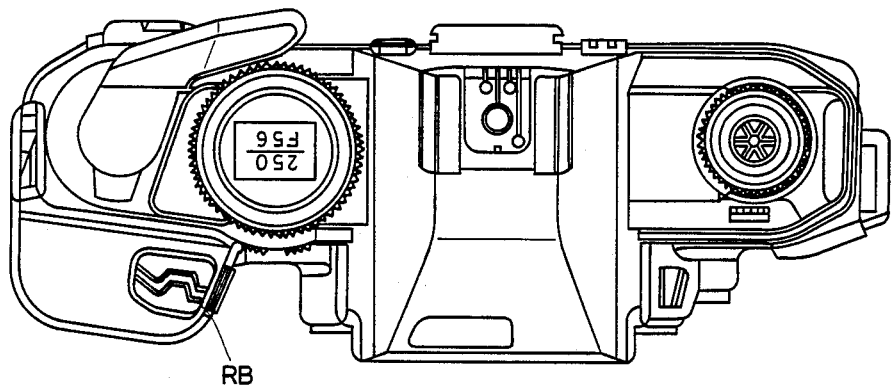
FIG. 17 is an upper-side view of a camera applied for the present invention.
Figure 18:
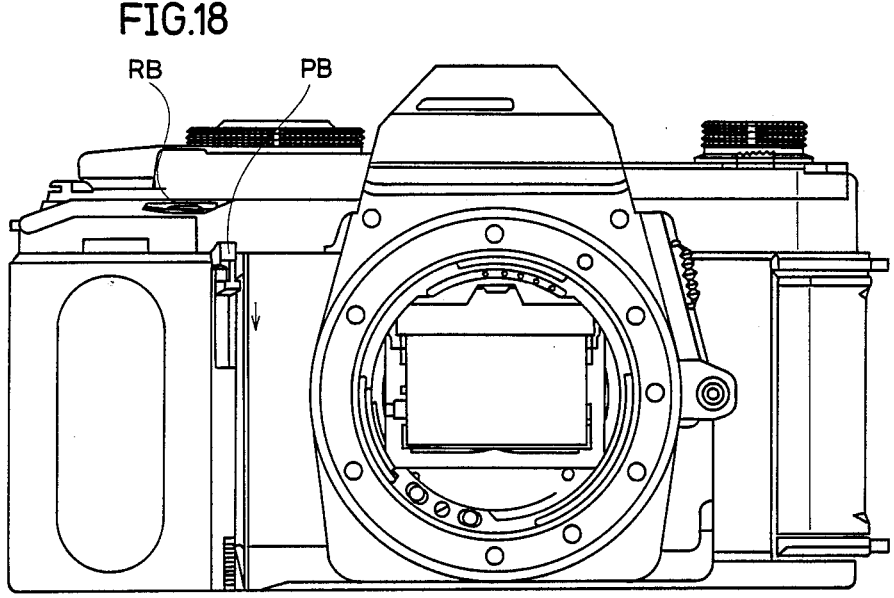
FIG. 18 is a front view of the camera.

The microcomputer 1 is further connected with a light measuring switch S1, a release switch S2, an exposure end switch S3, a preview operation switch S4 and a preview control switch S5. The light measuring switch S1 turns on at an initial stage of a depression of a shutter release button RB shown in FIGS. 17 and 18, in cooperation with the release button. A program based on an operation flow chart to be described below starts to be executed in response to a signal falling when the light measuring switch S1 is turned on. The release switch S2 turns on when the shutter release button RB is pressed to the lowest position, whereby exposure operation is performed. The exposure end switch S3 turns on when the exposure operation is completed. The preview operation switch S4 turns on when a preview lever PB shown in FIGS. 17 and 18 is depressed along a direction (Y). The preview control switch S5 turns on when preview control is performed to stop down the aperture diaphragm to a predetermined value, namely, when preview control is completed.

In a preview mechanism used in the embodiment shown in FIG. 1, when the preview operation switch S4 is manually operated, the magnet Mg is controlled by the aperture control portion 4 so that the aperture is set to a predetermined aperture value. Cancellation of the preview operation is made in cooperation with a shutter mechanism not shown after completion of the exposure or by operation of the manual lever PB, for preview cancellation, so that the aperture set to the predetermined value is returned to the minimum aperture value. Simultaneously with the cancellation of the preview operation, the preview control switch S5 is turned off.

Figure 2:
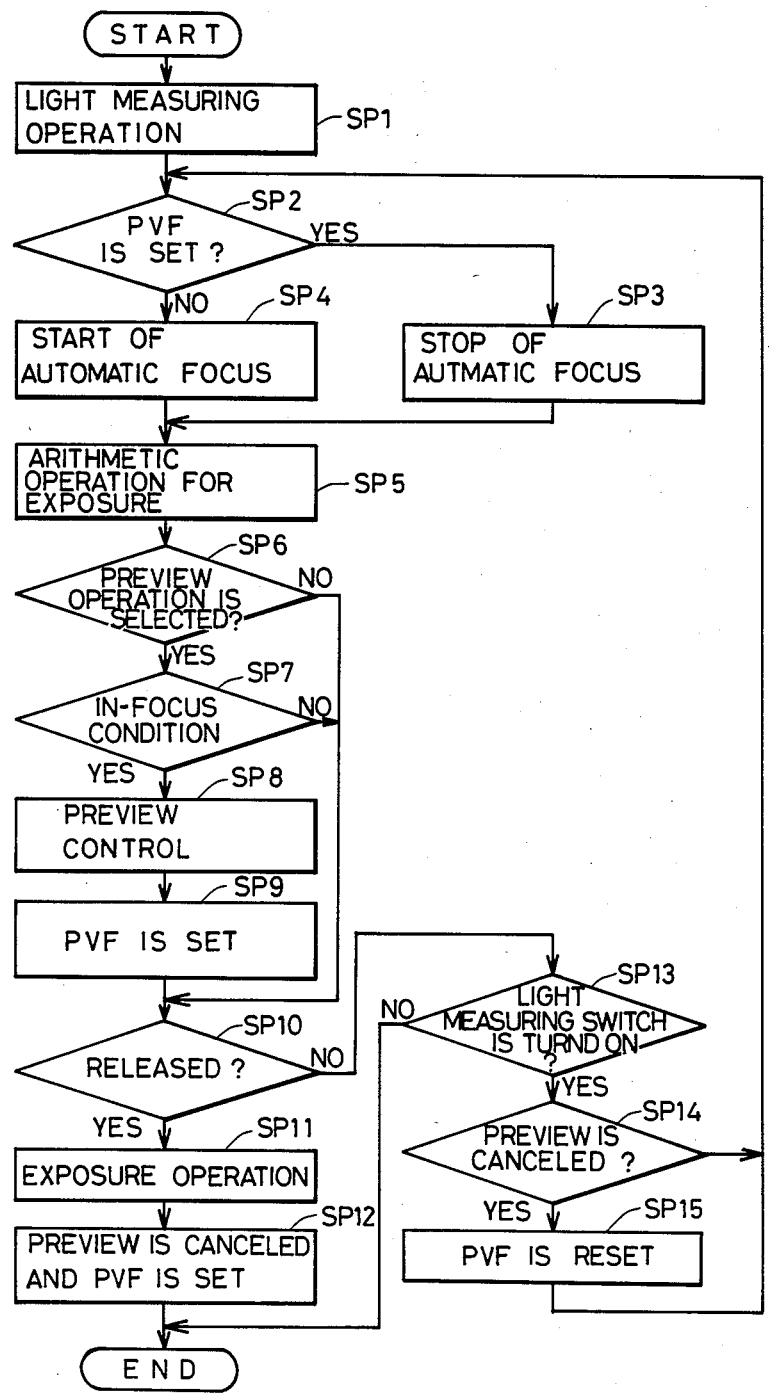
FIG. 2 is a flow chart for explaining an outline of operation of the first embodiment of the present invention.

FIG. 2 is a flow chart for explaining an outline of operation of the first embodiment of the present invention.

Referring to FIGS. 1 and 2, photographing operation in this embodiment of the invention will be described. When the shutter release button RB of the camera is pressed at the first stage, the light measuring switch S1 shown in FIG. 1 is turned on so that the program based on the flow chart shown in FIG. 2 starts to be executed. More specifically, in the step SP1, the light measuring circuit 3 measures light coming from an object to be photographed. The microcomputer 1 determines in the step SP2 whether a preview flag PVF indicating that preview operation has been done is set or not. Since the preview control switch S5 is turned on as described above when preview operation is terminated, setting of the preview flag PVF means that the preview control switch S5 is turned on.

In the initial state, the preview operation is not yet performed and accordingly the microcomputer 1 determines that the preview flag PVF is in a reset state and the program proceeds to the step SP4. In the step SP4, the automatic focus control portion 6 performs automatic focus detecting operation. In the step SP5, the microcomputer 1 performs arithmetic operation for exposure and in the step SP6, the microcomputer 1 determines whether preview operation has been selected or not. This determination is made by determination as to whether the preview operation switch S4 shown in FIG. 1 is turned on or not. If it is determined in the step SP6 that the preview operation switch S4 is turned on, it is determined whether the lens is in an in-focus condition or not by the automatic focus control portion 6 in the step SP7. If the lens is in the in-focus condition, the microcomputer 1 performs preview control in the step SP8. When the preview control by the microcomputer 1 is completed, the preview flag PVF is set in the step SP9.

If the microcomputer 1 determines that the lens is not in the in-focus condition in the above stated step SP7, the program proceeds to the step SP10. If it is determined in the above stated step SP6 that preview operation has not been done, the program skips the steps SP8 and SP9 and advances directly to the step SP10. In the step SP10, the microcomputer 1 determines whether shutter release operation has been done or not. This determination is made by determination as to whether the release switch S2 is turned on or not.

If it is determined in the step SP10 that shutter release operation has been done, the microcomputer 1 performs exposure operation in the step SP11. When the exposure operation is completed, the exposure end switch S3 is turned on. Then in the step SP12, the preview operation is cancelled and the preview flag PVF is reset and thus the preview control switch S5 is turned off to bring a photographing operation to an end.

If it is determined in the above stated step SP10 that shutter release operation is not yet done, namely, that the shutter release button RB is not fully pressed to the second stage, it is determined in the step SP13 whether the light measuring switch S1 is turned on or not. If the release button is pressed at the first stage, this means that the light measuring switch S1 is turned on and the program proceeds to the step SP14. If the shutter release button RB is not pressed, the light measuring switch S1 is turned off and the operation comes to an end. If the light measuring switch S1 is turned on, it is determined in the step SP14 whether the preview operation is cancelled or not.

The preview operation can also be cancelled manually as described above. If the preview operation is not cancelled, the program advances immediately to the above stated step SP2. If the preview operation is cancelled, the preview flag PVF is reset in the step SP15 and the program returns to the step SP2. In the step SP2, if the preview control has been done and the preview operation is not cancelled, the preview flag PVF is set and accordingly the program proceeds to the step SP3. Since the aperture diaphragm is stopped down corresponding to the predetermined aperture value at this time, the automatic focus detecting operation by the automatic focus control portion 6 is stopped in the step SP3 and the program proceeds to the step SP5, where arithmetic operation for exposure is performed. Subsequently, the operations in the steps SP6, 7 etc. are performed.

As described above, in this embodiment of the invention, preview control is performed after automatic focus detecting operation has been done. Thus, the automatic focus detecting operation and the preview control can be performed irrespective of the predetermined aperture value.

Figure 3:
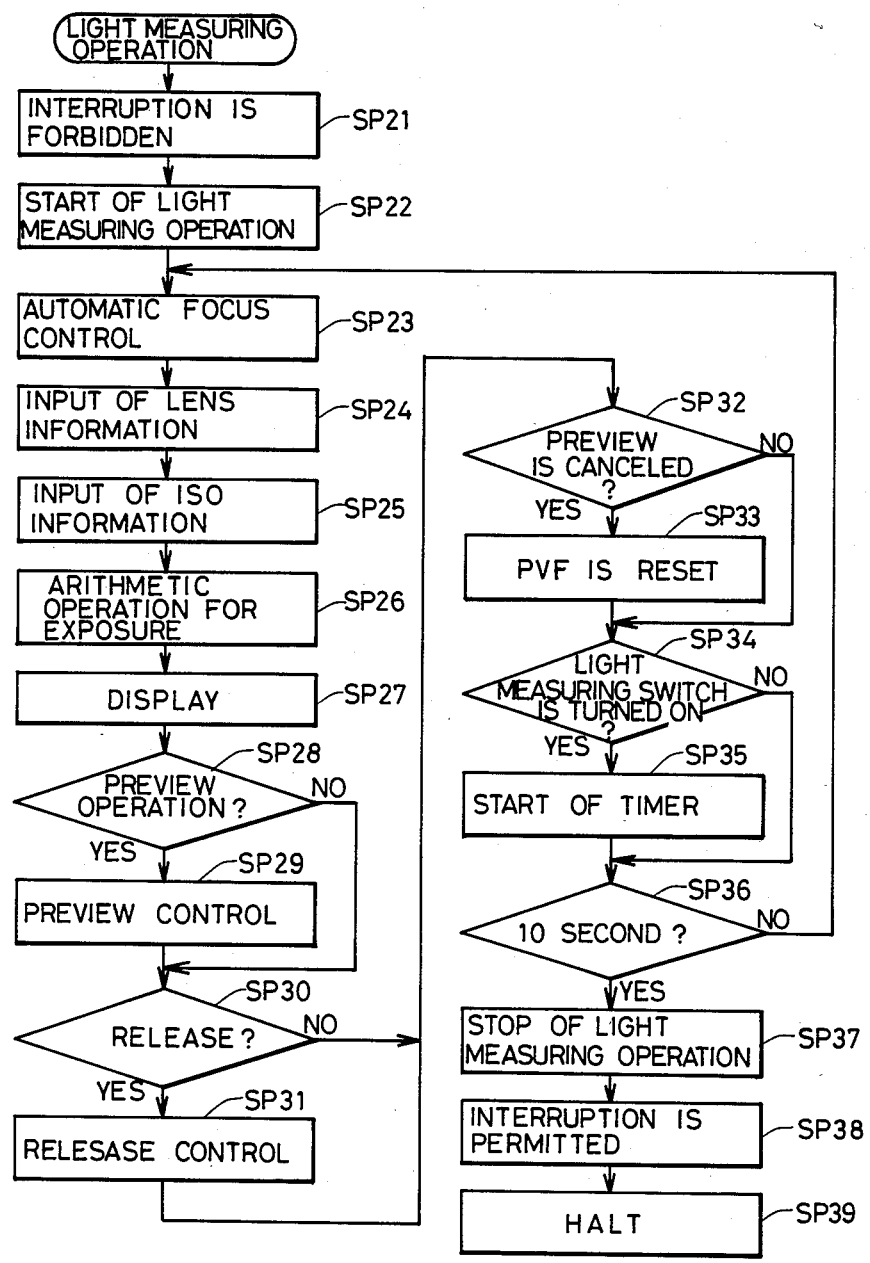
FIG. 3 is a flow chart for explaining more specifically the first embodiment of the present invention.
Figure 4:
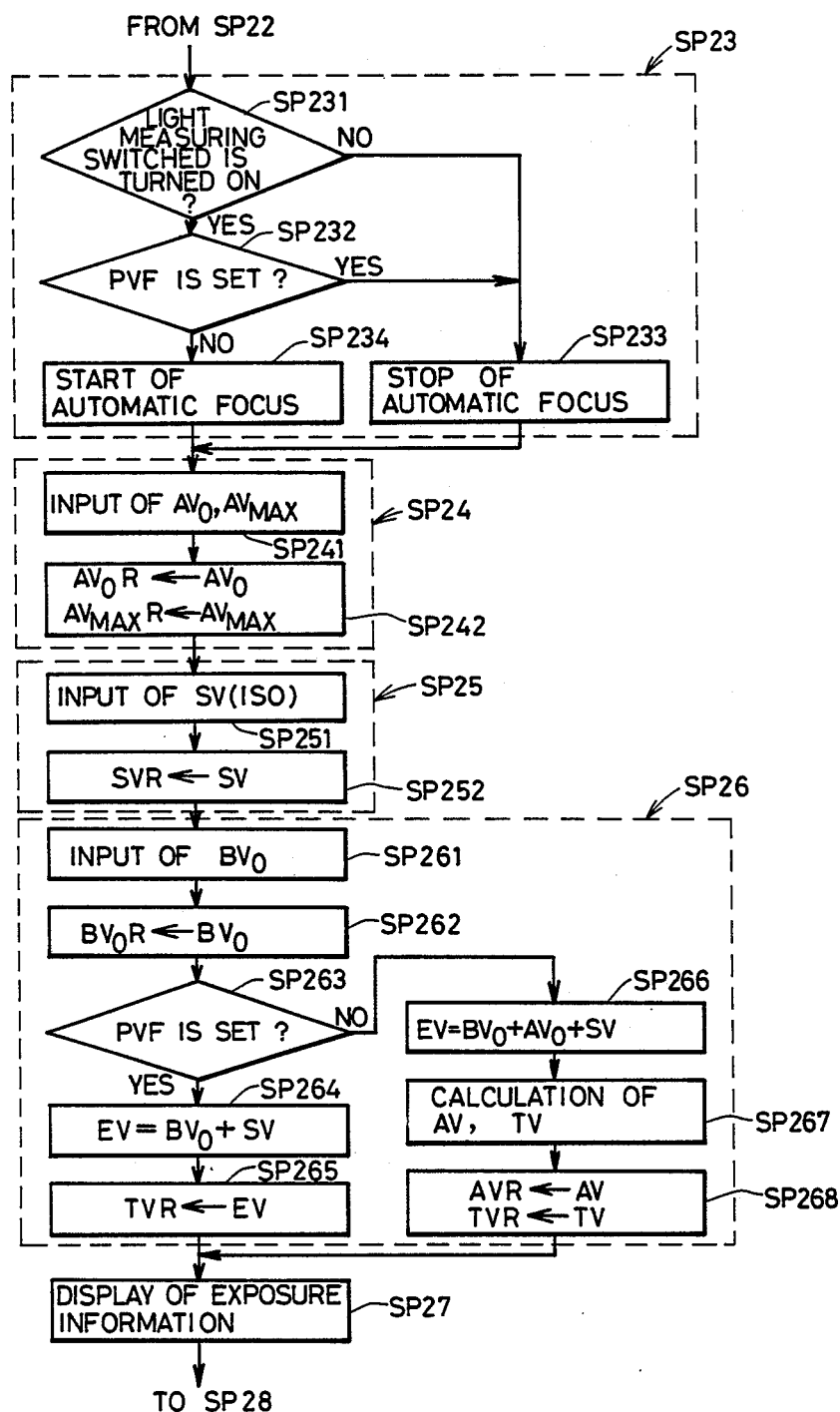
FIGS. 4 and 5 are flow charts showing in more detail the main steps of the flow chart in FIG. 3.
Figure 5:
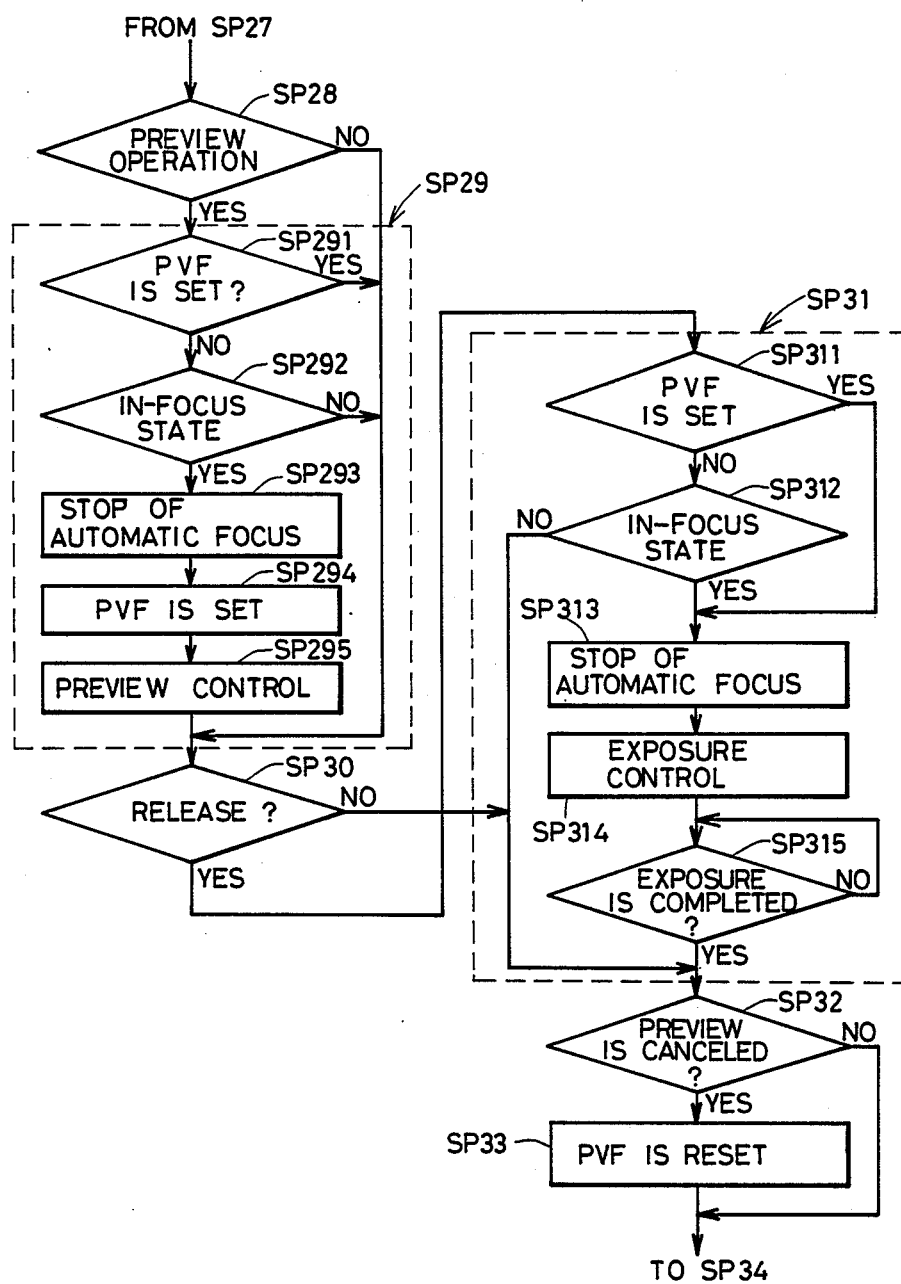

FIG. 3 is a flow chart for explaining more specifically the operation of the first embodiment of the invention and FIGS. 4 and 5 are flow charts showing in more detail the main steps in the flow chart shown in FIG. 3.

Referring to FIGS. 3 to 5, the operation of the first embodiment of the invention will be described in a more specific manner. When the shutter release button RB is pressed, the light measuring switch S1 is turned on and an interruption signal falling from a "H" level to an "L" level is applied to a terminal INT of the microcomputer 1. Consequently, the microcomputer 1 performs light measuring operation. More specifically, the microcomputer 1 forbids, in the step SP21, interruption in the program based on the flow chart shown in FIG. 3 and provides a light measurement start signal to the light measuring circuit 3 in the step SP22 to start light measuring operation. Then, in the step SP23, the microcomputer 1 makes control to start or stop automatic focus detecting operation dependent on the state at that time.

Subsequently, in the step SP24, the microcomputer 1 inputs data of the lens mounted on the camera body from the ROM2 and in the step SP25, it inputs data of the film sensitivity from the film sensitivity setting portion 5. In the step SP26, the microcomputer 1 performs arithmetic operation for exposure based on the brightness of the object to be photographed and the input data of the lens and the film sensitivity. In the step SP27, the microcomputer 1 displays on the display portion 7 the information of exposure including an aperture value and a shutter speed, and the information of the film sensitivity.

Then, the microcomputer 1 determines in the step SP28 whether preview operation has been selected or not. If preview operation has been selected, the microcomputer 1 performs preview control in the step SP29. If preview operation has not been selected, the program skips the step SP29 and proceeds to the step SP30. The microcomputer 1 determines in the SP30 whether the shutter release switch S2 is turned on or not. If the microcomputer 1 determines that the shutter release switch S2 is turned on, it performs release control in the step SP31. If the shutter release switch S2 is not turned on, the program skips the step SP31 and proceeds to the step SP32. The microcomputer 1 determines in the step SP32 whether the preview control is cancelled or not. If it is determined that the preview control is cancelled, the preview flag PVF set by the preview control is reset at the step SP33. If the preview control is not cancelled, the program skips the step SP33 and proceeds to the step SP34.

Subsequently, the microcomputer 1 makes control to maintain the power supply. First, in the step SP34, the microcomputer 1 determines based on the input of an input port PI1 whether the light measuring switch S1 is turned on or not. If the light measuring switch S1 is turned on, the microcomputer 1 resets a timer in the step SP35 and sets the timer to 10 sec to start measuring a time period. This timer is formed by hardware and is contained in the microcomputer 1. When the light measuring switch S1 is turned on, the timer is reset and starts measuring a time period after that.

If the light measuring switch S1 is not turned on, the microcomputer 1 makes the timer continue measuring a time period and determines in the step SP36 whether 10 seconds have passed or not. If the time period measured by the timer does not exceed 10 sec., the microcomputer 1 returns to the above stated step SP23. If it exceeds 10 sec., the microcomputer 1 stops the light measuring operation in the step SP37. Then, the microcomputer 1 permits interruption in the program based on the flow chart shown in FIG. 3, so that a hold state is established in the step SP39.

The steps SP23 to SP31 of the above described procedures will be described in more detail with reference to FIGS. 4 and 5. First, in the automatic focus detecting operation in step SP23, the microcomputer 1 determines in the step SP231 whether the light measuring switch S1 is turned on or not. If the light measuring switch S1 is turned on, the microcomputer 1 determines in the step SP232 whether the preview flag PVF is set or not. If it is determined that the preview flag PVF is not set, which means the normal state, the program proceeds to the step SP234, where the microcomputer 1 makes the automatic focus detection start signal AFS rise to the "H" level and supplies it to the automatic focus control portion 6 to start automatic focus control operation.

On the other hand, if it is determined in the step SP231 that the light measuring switch S1 is turned off, or if it is determined in the step SP232 that the preview flag PVF is set, which means that the photographer intends to stop the automatic focus control operation or that the aperture diaphragm is already stopped down, the microcomputer 1 stops the automatic focus control operation in the step SP233 because it is impossible to continue the automatic focus control operation.

Then, in the operation of inputting information of the lens in the step SP24, the microcomputer 1 inputs from the ROM2 a minimum aperture value $AV_0$ of the interchangeable lens presently used and a maximum aperture value AV$_{MAX}$ so that those data are stored in predetermined registers AV$_0$R, AV$_{MAX}$R in the step SP242.

In the operation of inputting information of the film sensitivity in the step SP25, an apex value SV (ISO) as the film sensitivity is inputted from the film sensitivity setting portion 5 in the step SP251 and the apex value SV is stored in a register (SVR) in the step SP252.

In the arithmetic operation for exposure by the microcomputer 1 in the subsequent step SP26, the brightness value measured through the aperture diaphragm at that time is inputted from the light measuring circuit 3 as an apex value BV$_0$ in the step SP261 and this apex value BV$_0$ is stored in a register BV$_0$R in the step SP262. Then, in the step SP263, the microcomputer 1 determines whether the preview flag PVF is set to terminate the preview control. If the preview flag PVF is not set, normal arithmetic operation for exposure is performed in the steps SP266 to 268.

More specifically, in the step SP266, the measured optical value BV$_0$ and the minimum aperture value AV$_0$ inputted as described above and the film sensitivity value SV are added to calculate an exposure value EV. Further, in the step SP267, arithmetic operations are performed according to the respective prescribed modes such as a program mode, an aperture priority shutter speed automatic control mode and a shutter speed priority aperture automatic control mode so that an aperture value AV and/or a shutter speed TV are calculated. The microcomputer 1 stores the calculated aperture value AV and shutter speed TV in registers AVR, TVR in the step SP268.

On the other hand, if the preview control is completed and the preview flag PVF is set, the aperture is set to a prescribed aperture value and accordingly the shutter speed is calculated by adding the film sensitivity value SV to the value BV$_0$ of the brightness of the object applied through the lens when the aperture is set to that aperture value. Thus, in the step SP264, the microcomputer 1 uses as the exposure value EV the value obtained by adding the film sensitivity SV to the value BV$_0$ of the brightness of the object. In the step SP265, the microcomputer 1 stores this exposure value EV in the register TVR for shutter speed data. Consequently, exposure control is made by combination of this shutter speed and the aperture value at the time of preview operation.

The microcomputer 1 displays on the display portion 7, in the step SP27, exposure data obtained by converting the aperture value AV and the shutter speed TV calculated in the steps SP268 and SP265, respectively, to an F value and a time value, respectively.

Subsequently, the microcomputer 1 determines in the step SP28 of FIG. 5 whether preview operation has been selected or not based on determination as to whether the preview operation switch S4 is turned on or not. If it is determined that preview operation has not been selected, the procedure is not related with preview control and in the step SP30, determination as to shutter release operation is selected. If the microcomputer 1 determines that the preview operation switch S4 is operated, the program proceeds to the step SP29 and it is determined in the step SP291 whether the preview flag PVF is set or not. If it is determined that the preview flag PVF is set, this means that preview control has been already completed and further preview control is not required. Accordingly, the microcomputer 1 proceeds to determination as to shutter release operation in the step SP30.

If it is determined that the preview flag PVF is not set, it is determined in the step SP292 whether the lens is in the in-focus condition or not. This determination as to the in-focus condition is made based on the automatic focus detection end signal AFE from the automatic focus control portion 6. If the lens is not in the in-focus condition, preview control is not made and the program proceeds to the step SP30. If it is determined that the lens is in the in-focus condition, the microcomputer 1 makes the automatic focus detection start signal AFS fall to the "L" level in the step SP293 to stop the automatic focus control operation and in the step SP294, the microcomputer 1 sets the preview flag PVF. Then, the microcomputer 1 provides a controlled aperture value AV and a control signal to the aperture control portion 4 so that preview control is made.

As a result, the aperture control portion 4 sets the aperture diaphragm to the prescribed aperture value AV. The reason for stopping automatic focus control operation prior to preview control as described above is that it would sometimes happen that automatic focus detecting operation could not be performed with an aperture value obtained after preview control or an out-of-focus signal would be provided in spite of the in-focus condition.

Then, the microcomputer 1 determines in the step SP30 whether the shutter release operation is selected or not based on determination as to whether the shutter release switch S2 is turned on or not. If the shutter release operation is not selected, the microcomputer 1 proceeds to preview control determining operation in the step SP32. If the shutter release operation is selected, the program proceeds to the step SP31 and the microcomputer 1 determines in the step SP311 whether the preview flag PVF is set or not. If the microcomputer 1 determines that the preview flag PVF is set, it skips the step SP312 and it stops the automatic focus control operation in the step SP313 and performs exposure control in the step SP314. The reason for skipping the step SP312 concerning the determination as to the in-focus condition is tha automatic focus control operation has been already completed when preview control is made.

If the preview flag PVF is not set, namely, if preview control is not made, the microcomputer 1 makes determination as to the in-focus condition in the step SP312. When it is determined that the lens is in the in-focus condition, the microcomputer 1 stops the automatic focus control operation and performs exposure control in the step SP314. When it is determined that the lens is not in the in-focus condition, determination as to preview control is made in the step SP32 so as to forbid exposure control. The microcomputer 1 performs exposure control in the step SP314 and when it is determined in the step SP315 that the exposure control is completed, the program proceeds to the step SP32.

If the microcomputer 1 determines in the step SP32 that the preview control switch S5 is turned on, namely, if the preview control is already performed, the program skips the step SP33. If the microcomputer 1 determines that the preview control switch S5 is turned off, it resets the preview flag PVF in the step SP33. After the exposure control has been made, the preview operation is cancelled as described above and the preview control switch S5 is turned off. In manual focusing operation, preview control is started immediately after manual preview operation, and the shutter is always ready to be released and if the shutter release operation is selected, exposure control is started without fail.

Thus, in the first embodiment of the invention as described in the foregoing, exposure control is performed after the lens has been brought into the in-focus condition in the on state of shutter release switch S2, irrespective of whether preview operation is selected or not. However, if the steps SP311 and SP312 are omitted, exposure control starts immediately in response to the turning on of the shutter release switch S2.

Figure 6:
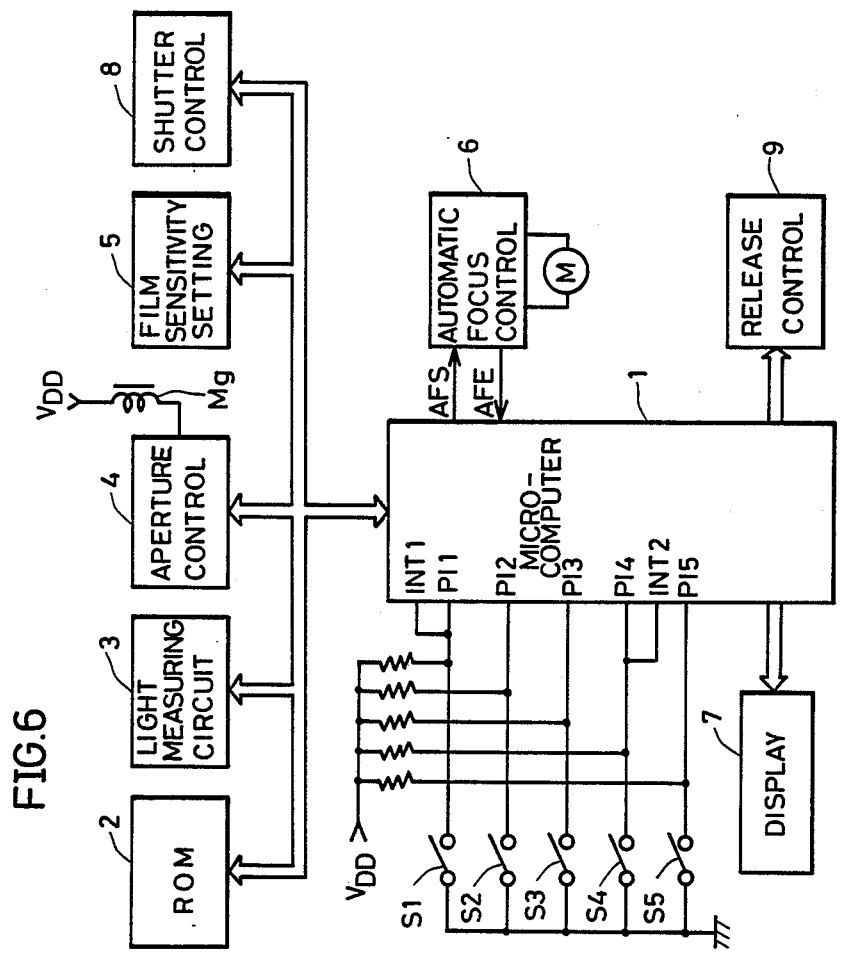
FIG. 6 is a schematic block diagram of a second embodiment of the present invention.

FIG. 6 is a schematic block diagram of a second embodiment of the present invention. The block diagram in FIG. 6 shows the same construction as the above described construction shown in FIG. 1, except that an interruption signal for light measuring operation is applied to a terminal INT2 of the microcomputer 1 in response to a fall signal of the preview cohtrol switch S4 when the preview control switch S4 is operated.

Figure 7:
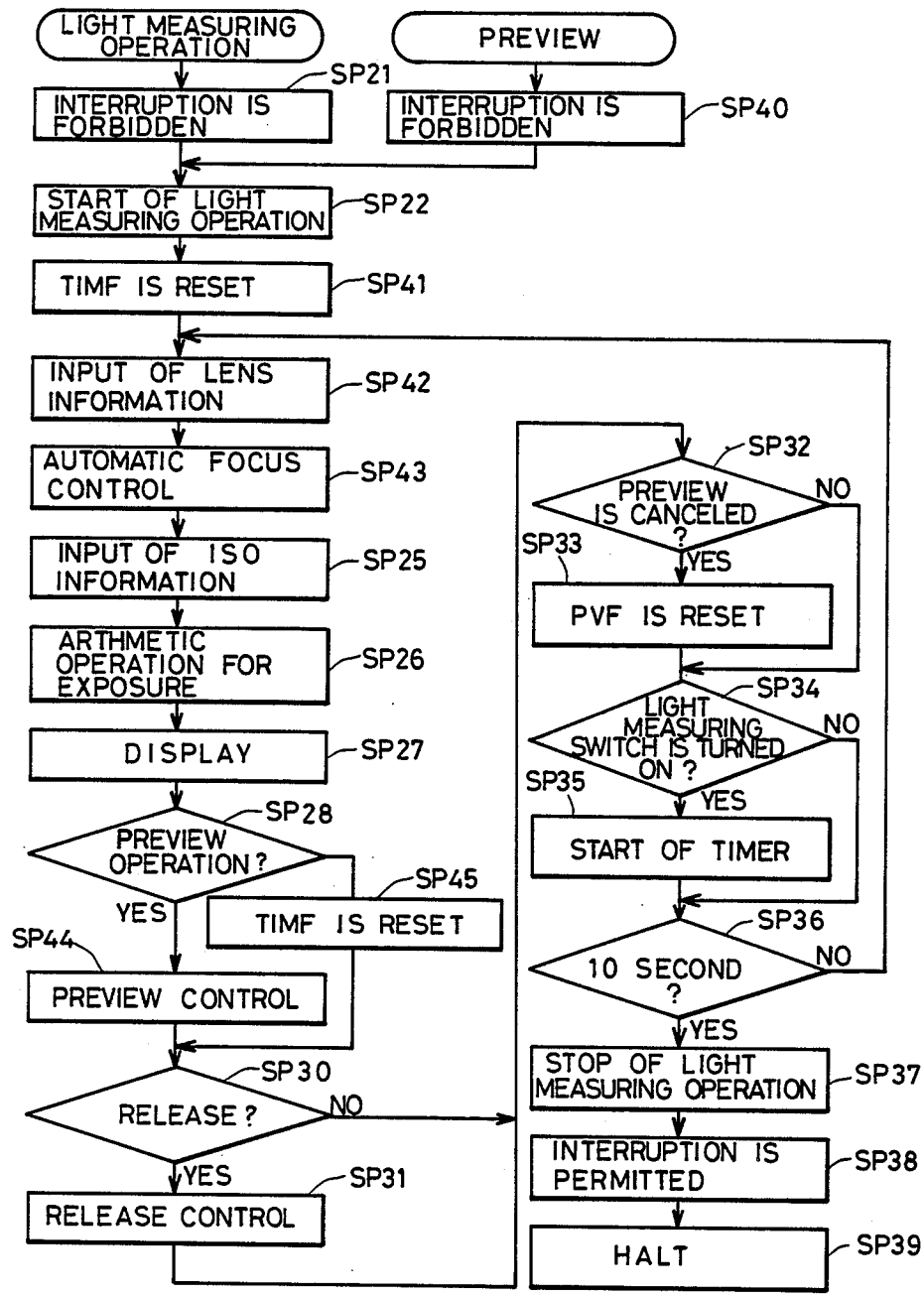
FIG. 7 is a flow chart for explaining a specific operation of the second embodiment of the present invention.
Figure 8:
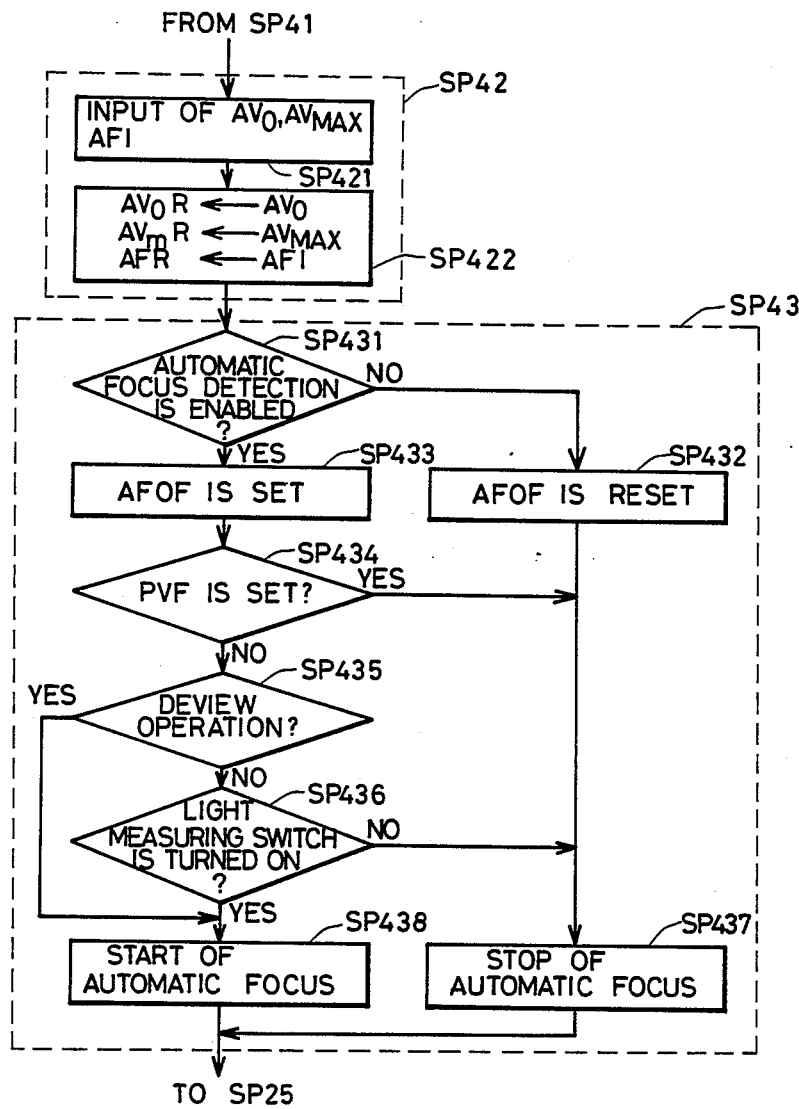
FIGS. 8 and 9 are flow charts showing in more detail the main steps of the flow chart in FIG. 7.
Figure 9:
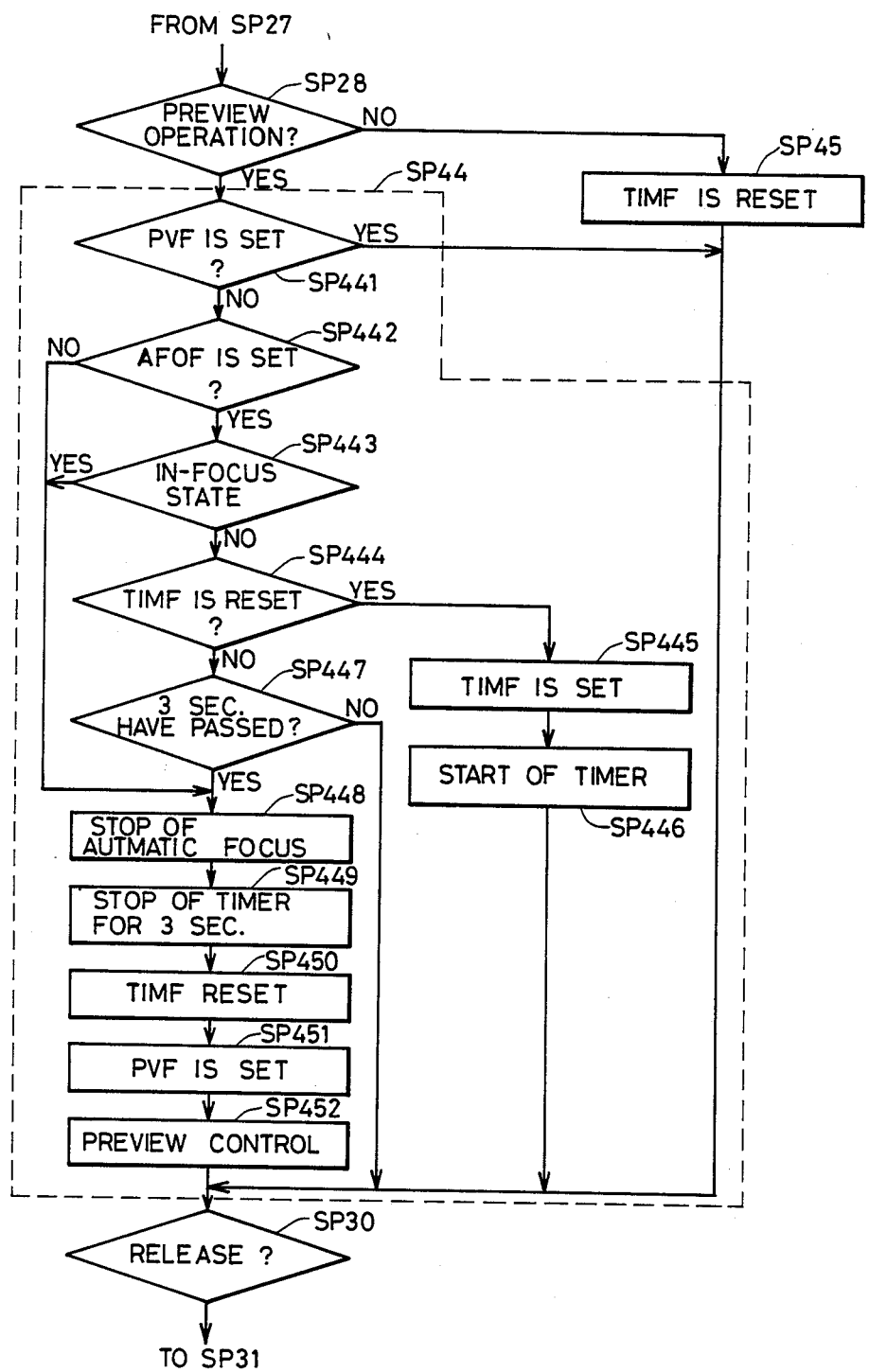

FIG. 7 is a flow chart for explaining a specific operation of the second embodiment of the present invention and FIGS. 8 and 9 are flow charts showing in more detail the main steps of the flow chart shown in FIG. 7.

Referring to FIGS. 6 to 9, the operation of the second embodiment will be described in the following. This second embodiment is adapted to permit a preview control in case where a lens not capable of automatic focus detecting operation, e.g. a lens having a minimum aperture value AV exceeding 5.5 (F6.5) or a lens having a catadioptric lens system is mounted on the camera. In the above described first embodiment of the invention, preview control can not be made if the automatic focus detection end signal AFE is not applied to the microcomputer 1 because of a low contrast value of the object or a low brightness value thereof. This second embodiment makes an improvement in this point so that preview control can be made in such a case. In addition, the second embodiment is adapted to perform light measuring operation and automatic focus control operation in case of operating the preview operation switch S4 in the same manner as in case of operating the light measuring switch S1.

Since the flow chart in FIG. 7 is almost the same as the flow chart in FIG. 3, only the different points will be described. First, when the preview operation switch S4 is operated, the microcomputer 1 forbids interruption in the step SP40 and starts light measuring operation in the step SP22. Then, after the start of the light measuring operation, the microcomputer 1 resets a timer flag TIMF in the step SP41 and inputs information of the lens in the step SP42, whereby automatic focus control operation is performed in the step SP43. Furthermore, the operations in the steps SP25 to SP27 are performed and after that, when it is determined in the step SP28 that preview operation has not been selected, the above described timer flag TIMF is reset in the step SP45. Subsequently, the operations in the steps SP30 to SP39 are performed in the same manner as described above with reference to FIG. 3.

In the following, the flow charts in FIGS. 8 and 9 will be described. In the operation of inputting information of the lens in the step SP42, the microcomputer 1 inputs, in the step SP421, the minimum aperture value $AV_0$, the maximum aperture value $AV_{MAX}$ and the automatic focus detection information AFI from the ROM2 contained in the interchangeable lens. The automatic focus detection information AFI is information indicating whether the interchangeable lens mounted on the camera is a lens capable of automatic focus detection or not.

The microcomputer 1 stores all the above described information predetermined registers $AV_0R$, $AV_mR$ and AFR in the step SP422.

In the automatic focus control operation in the step SP43, the microcomputer 1 determines in the step SP431 based on the above described automatic focus detection information AFI whether automatic focus detection is permitted or not. If the automatic focus detection is permitted, the microcomputer 1 sets the flag AFOF in the step SP433 and determines in the step SP434, based on determination as to the state of the preview flag PVF, whether preview control is performed or not. If the automatic focus detection is not enabled in the step SP431, the microcomputer 1 resets the flag AFOF in the step SP432.

When it is determined in the step SP434 that the preview flag PVF is set and accordingly the preview control is performed, or that the automatic focus detection is not permitted, the microcomputer 1 stops the automatic focus control operation in the step SP437. On the other hand, when it is determined in the step SP435 that preview operation has not been selected, the microcomputer 1 determines in the step SP436 whether the light measuring switch S1 is turned on or not. When it is determined that the light measuring switch S1 is turned on, the microcomputer 1 starts automatic focus control operation in the step SP438 and if both the preview operation switch S4 and the light measuring switch S1 are turned off, it stops the automatic focus detecting operation in the step SP437.

Referring now to FIG. 9, the procedure of preview control will be described. When the microcomputer 1 determines in the step SP28 that the preview operation switch S4 is operated, it proceeds to preview control in the step SP44. In the step SP441, the microcomputer 1 determines whether the preview flag PVF is set or not. If the preview flag PVF is set and preview control is being done, it proceeds to the step SP30 to execute determining operation as to release of the shutter.

On the other hand, if it is determined that the preview flag PVF is not set and preview control is not performed, the microcomputer 1 determines in the step SP442 whether the flag AFOF indicating a state enabling automatic focus detecting operation is set or not. If the microcomputer 1 determines that the flag AFOF is not set or if it determines in the step SP443 that the lens is in the in-focus condition, it stops automatic focus control operation in the step SP448 to perform preview control. If the lens is not in the in-focus condition although it is enabled to make automatic focus detecting operation, the in-focus condition will never be established if the out-of-focus condition is caused due to a low brightness value of the object or a low contrast value thereof. For this reason, preview control can not be made in this case in the above described first embodiment.

On the other hand, according to the second embodiment of the invention, if the automatic focus detection end signal AFE is not applied from the automatic focus control portion 6 to the microcomputer 1 during a prescribed period, this is regarded as being caused by a low brightness value or a low contrast value to stop the automatic focus detecting operation, whereby preview control can be started.

More specifically, in the step SP444, the microcomputer 1 determines whether the timer flag TIMF is reset or not. If the timer flag TIMF is reset, the microcomputer 1 sets the timer flag TIMF in the step SP445 and resets this timer in the step SP446 to make the timer start operation and then it proceeds to determination as to release of the shutter in the step SP30. If the timer flag TIMF is not reset, namely, if the timer measures a time period, it proceeds to the step SP447 to determine whether the time period measured by the timer exceed 3 seconds or not. If it does not exceed 3 seconds, the microcomputer 1 proceeds to determination as to release of the shutter in the step SP30. If the time period measured by the timer exceeds 3 sec., it is determined that it is impossible to continue the automatic focus control operation and the microcomputer 1 stops the automatic focus detecting operation in the step SP448 and stops the operation of the timer in the step SP449. Then, the timer flag TIMF is reset in the step SP450 and the preview flag PVF is set in the step SP451 so that preview control is started in the step SP452.

In this second embodiment of the invention, the determination as to whether the lens is enabled to perform automatic focus detecting operation is based on the automatic focus detection information AFI inputted from the ROM2 of the interchangeable lens. However, this determination may be made by determining whether the minimum aperture value $AV_0$ of the lens is larger than 5.5 or not.

Figure 10:
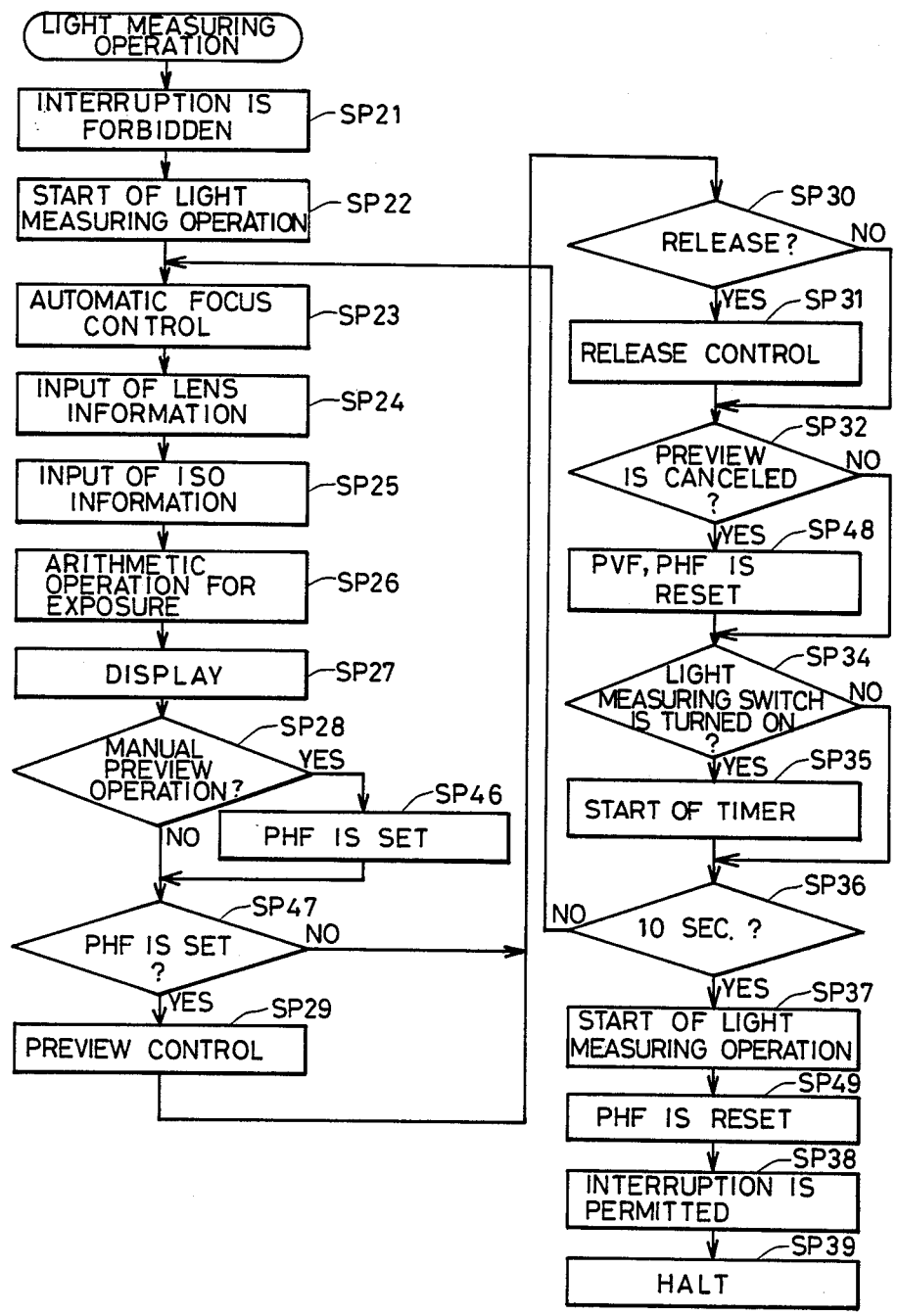
FIG. 10 is a flow chart for explaining a specific operation of a third embodiment of the present invention.

FIG. 10 is a flow chart for explaining a specific operation of a third embodiment of the present invention.

In the above described first and second embodiments, in order to apply preview control after manual preview operation, it is necessary to continue closing the preview operation switch S4 so that it is turned on until the in-focus condition is established. By contrast, according to the third embodiment of the invention, once preview operation has been selected, this operation is memorized and even if pressing of the preview operation switch S4 is stopped, preview control can be applied after the in-focus condition is established. The other operations are the same as described above with reference to FIG. 3. More specifically, in the determination as to preview operation in the step SP28 in the flow chart shown in FIG. 10, the flag PHF is set in the step SP46 if the preview operation has been selected and in the step SP47, it is determined whether preview operation is selected or not based on the determination as to whether the flag PHF is set, or not. The flag PHF, together with the preview flag PVF, is reset in the step SP48 after the preview control has been cancelled. Alternatively, the flag PHF is reset after the timer has measured a time period of 10 sec in the step SP49.

Figure 11:
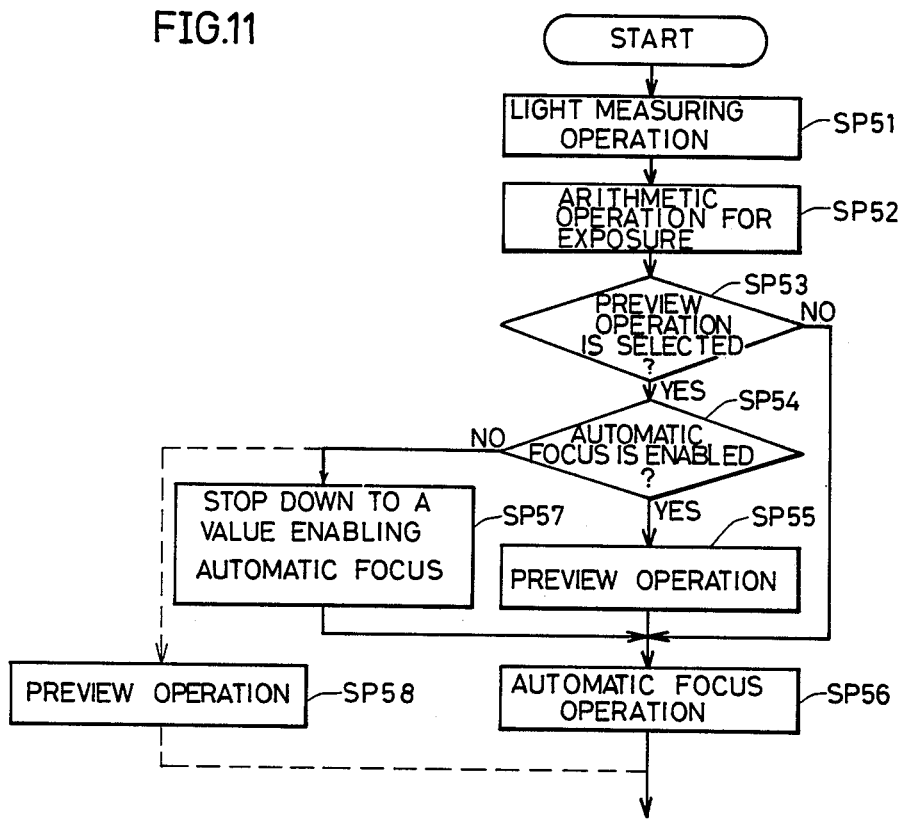
FIG. 11 a flow chart for explaining an outline of operation of a fourth embodiment of the present invention.

FIG. 11 is a flow chart for explaining an outline of operation of a fourth embodiment of the invention.

In this embodiment shown in FIG. 11, preview control is not started if automatic focus detecting operation can not be made with a prescribed aperture value after manual preview operation has been done, and instead of the preview control, the aperture diaphragm is stopped down to a maximum aperture value permissible for automatic focus detection so that automatic focus control operation can be performed.

More specifically, light measuring operation is performed in the step SP51 and arithmetic operation for exposure is performed in the step SP52. Then, it is determined in the step SP53 whether preview operation has been selected or not. If preview operation has been selected, it is determined in the SP54 whether automatic focus detecting operation is permitted with a desired aperture value. If automatic focus detecting operation is permitted, preview control is applied in the step SP55 and, after that, automatic focus detecting operation is made in the step SP56.

If it is determined in the above stated step SP54 that automatic focus detecting operation is not permitted, the aperture diaphragm is stopped down to the prescribed minimum aperture diameter (maximum aperture value) permissible for automatic focus detection instead of performing preview control in the step SP57 and automatic focus detecting operation is effected in the step SP56. Alternatively, in the step SP57, the desired aperture value is changed to the maximum aperture value permissible for automatic focus detection so that preview control may be performed in the step SP55.

In another embodimeht, if it is determined in the step SP54 that automatic focus detecting operation is not permitted, the aperture diaphragm may be stopped down to a desired aperture value in the step SP58 to start preview control and without effecting automatic focus detecting operation in the step SP56, the program may proceed to the subsequent steps.

Figure 12:
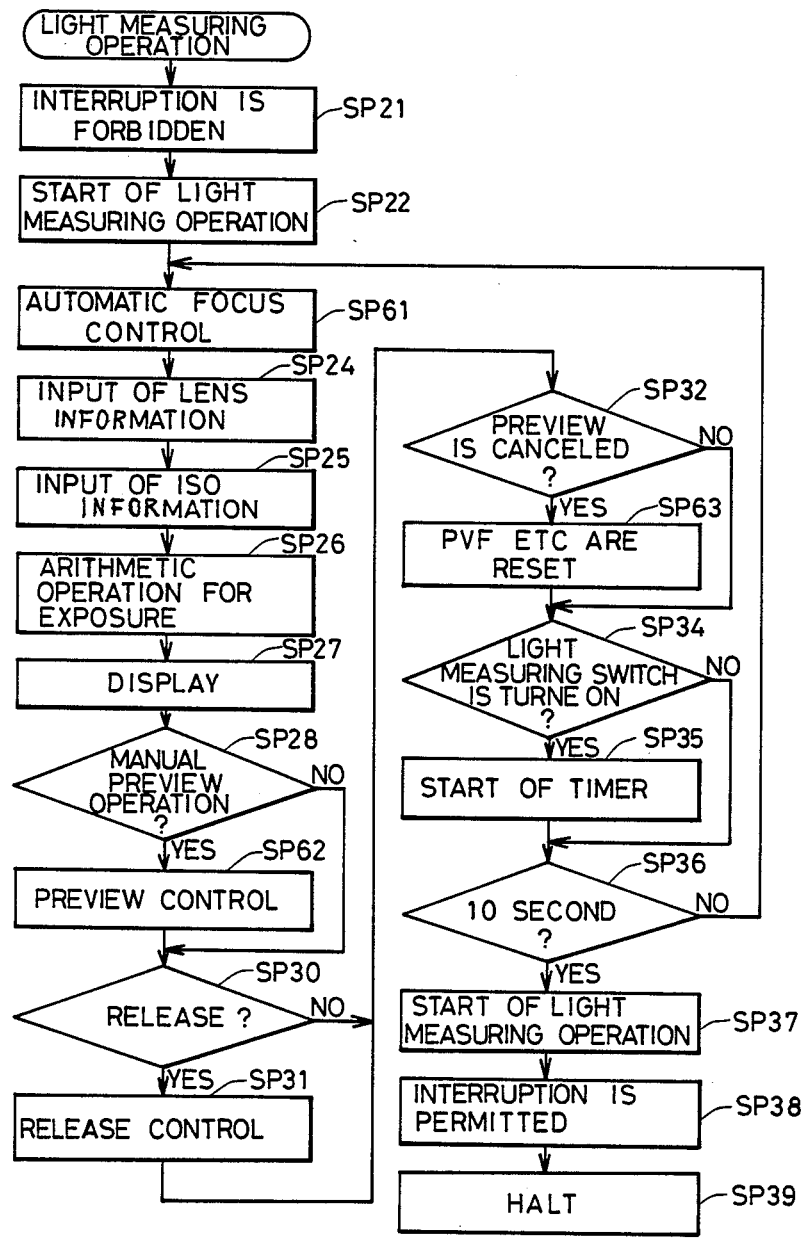
FIG. 12 is a flow chart for explaining more specifically the fourth embodiment of the present invention.
Figure 13:
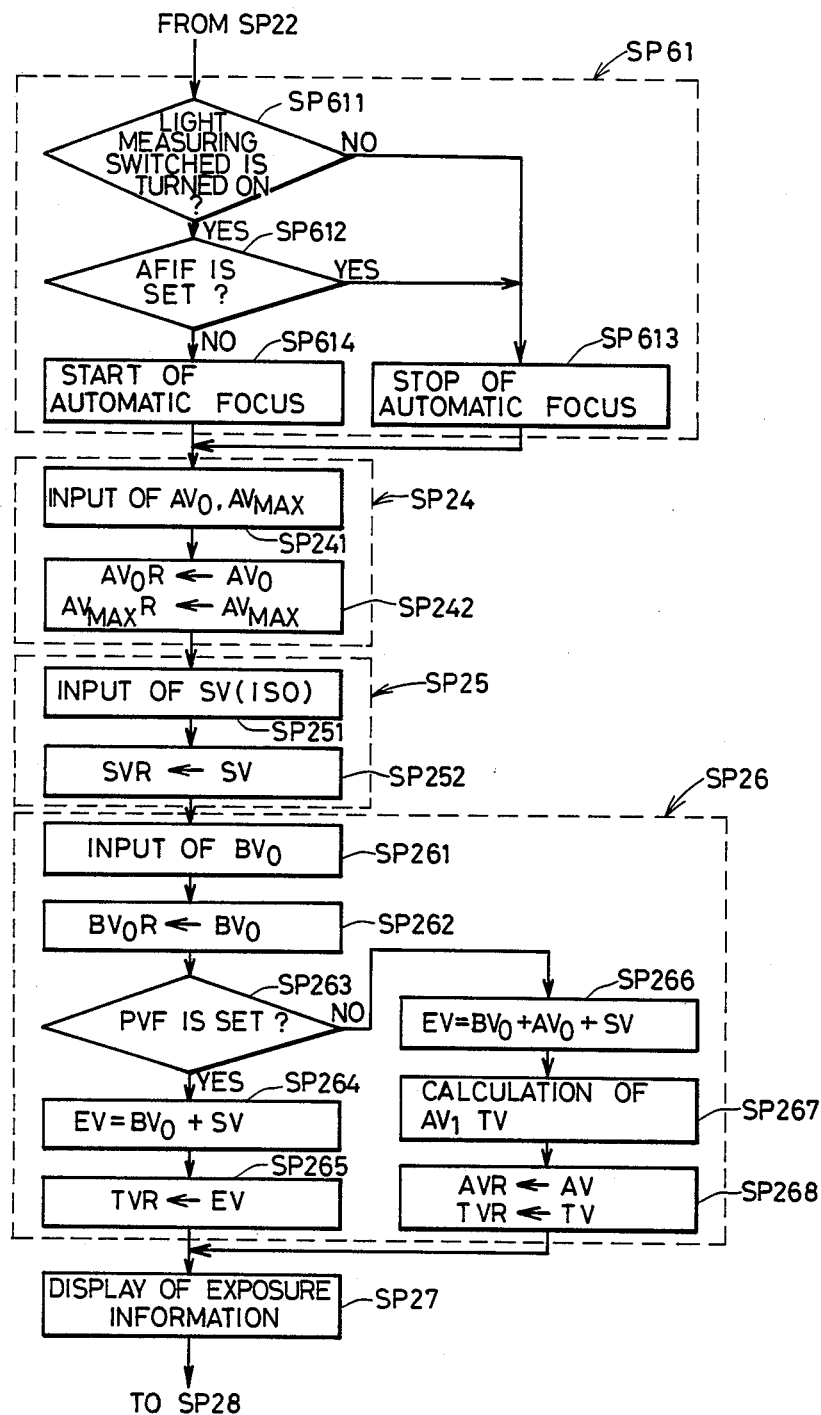
FIGS. 13 and 14 are flow charts showing in more detail the main steps of the flow chart in FIG. 12.
Figure 14:
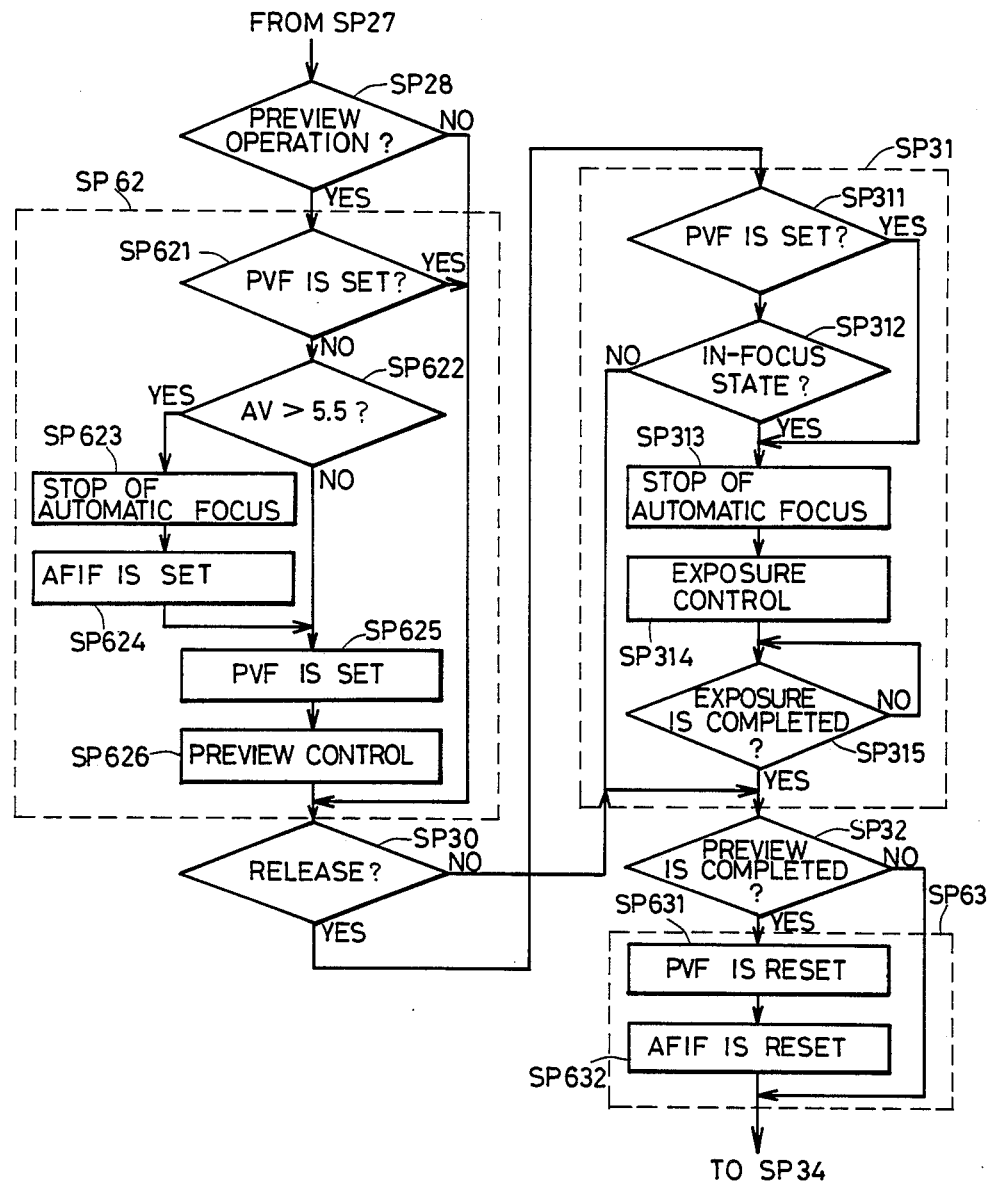

FIG. 12 is a flow chart more specifically showing the fourth embodiment of the invention and FIGS. 13 and 14 are more detailed flow charts of the main steps shown in the flow chart in FIG. 12.

Referring to FIGS. 12 to 14, the operation of the fourth embodiment of the present invention will be more specifically described. In FIG. 12, the step SP61 related to automatic focus detecting operation, the step SP62 related to preview control and the step SP63 related to resetting of the preview flag PVF etc. are different from the first embodiment shown in FIG. 3, operations in the other steps being the same as in the first embodiment.

Therefore, referring to FIGS. 13 and 14, the operations in the steps different from the above described first embodrment will be described in more detail. The microcomputer 1 forbids interruption in the step SP21 and starts light measuring operation in the step SP22 and then it proceeds to the step SP61. In the automatic focus detection control in the step SP61, the microcomputer 1 determines in the step SP611 whether the light measuring switch S1 is turned on or not. If the light measuring switch S1 is turned on, the microcomputer 1 determines in the step SP612 whether the automatic focus detection interrupting flag AFIF is set or not.

If the automatic focus detection interrupting flag AFIF is set, the microcomputer 1 stops the automatic focus detecting operation in the step SP613 and if it is not set, the microcomputer 1 starts automatic focus detecting operation in the step SP614. Then, in the step SP24, the lens information is stored in the registers $AV_0R$ and $AV_{MAX}R$ in the same manner as described above with reference to FIG. 4 and the film sensitivity information is inputted in the step SP25. Further, the microcomputer 1 performs arithmetic operation for exposure in the step SP26 and displays the result of the arithmetic operation on the display portion 7 in the step SP27.

The microcomputer 1 determines in the step SP28 whether preview operation has been selected or not. If preview operation has not been selected, the procedure is not related with preview control and it is determined in the step SP30 whether the shutter release operation is selected or not. If it is determined in the step SP28 that preview operation has been selected, it is determined in the step SP621 whethef the preview flag PVF is set or not. If the preview flag PVF is set, which means that preview control has been completed, the microcomputer 1 proceeds to the step SP30 to determine whether the shutter release operation is selected or not. If the preview flag PVF is not set, the microcomputer 1 proceeds to the step SP622 to determine whether the controlled aperture value AV is larger than the maximum aperture value (5.5) permissible for automatic focus detection. If the controlled aperture value AV is larger than 5.5, the microcomputer 1 proceeds to the step SP623 to stop the automatic focus control operation and then in the step SP624, it sets the automatic focus detection interrupting flag AFIF. Then, it sets the preview flag PVF in the step SP625 and provides a controlled aperture value and a control signal to the aperture control portion 4 so as to perform preview control. Thus, the aperture control portion 4 controls the aperture diaphragm so that it is a prescribed value.

If it is determined in the above stated step SP622 that the controlled aperture value AV is equal to or smaller than 5.5, the microcomputer 1 sets the preview flag PVF in the step SP625 and performs preview control in the step SP626. Thus, preview control can be made if the controlled aperture value is equal to or smaller than the maximum aperture value permissible for automatic focus detection.

Subsequently, the microcomputer 1 determines in the step SP30 whether the shutter release switch S2 is turned on or not. If the release switch S2 is not turned on, it proceeds to the step SP32. If the shutter release switch S2 is turned on, it performs shutter release control in the step SP31. When the release control is completed in the step SP31, the microcomputer 1 determines in the step SP32 whether the preview control is cancelled or not. More specifically, if the preview control switch S5 is turned on, the microcomputer 1 skips the step SP63. If the preview control switch S5 is turned off, it resets the preview flag PVF in the step SP631 and resets the automatic focus detection interrupting flag AFIF in the step SP632.

Figure 15:
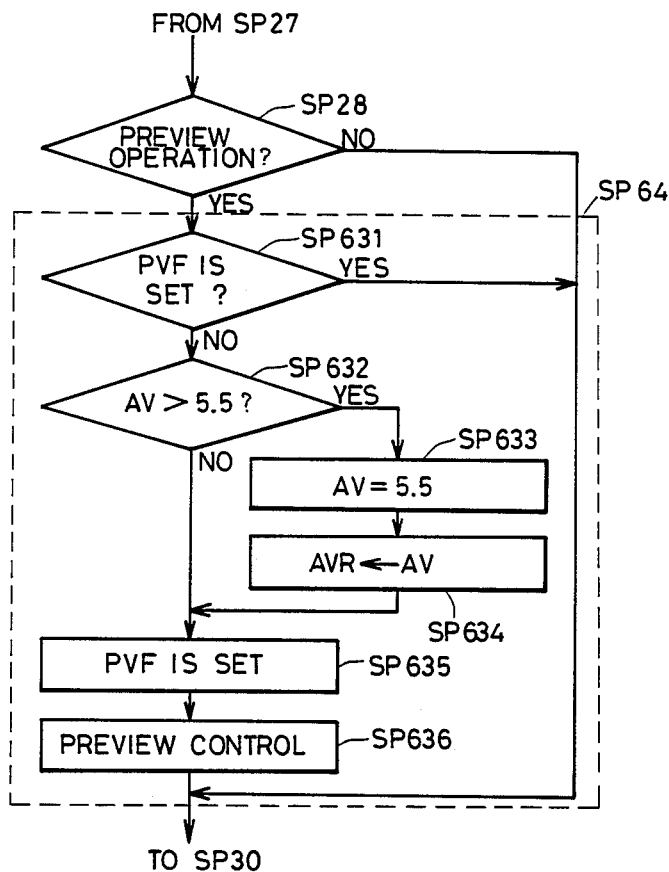

FIG. 15 is a flow chart for explaining operation of a fifth embodiment of the present invention. The flow chart in FIG. 15 is a modification of the step SP62 in the above described flow chart shown in FIG. 14. More specifically, the embodiment shown in FIG. 14 is adapted to stop automatic focus detecting operation if the controlled aperture value AV exceeds 5.5. On the other hand, in the embodiment shown in FIG. 15, if the controlled aperture value AV is larger than the maximum aperture value 5.5 permissible for automatic focus detection, the controlled aperture value AV is set to the maximum aperture value and preview control is applied without interrupting automatic focus detection.

More specifically, referring to FIG. 15, if the microcomputer 1 determines in the step SP632 that the the step SP633 to set the aperture value to 5.5 and then it changes the content of the register AVR for aperture data to 5.5 in the step SP634. Then, in the same manner as in the case of the aperture value AV being equal to or smaller than 5.5, the microcomputer 1 sets the preview flag PVF in the step SP635 and performs preview control in the step SP636. In.this case, it is necessary to exclude the above stated steps SP612 and SP632 shown in FIGS. 13 and 14, respectively.

As described above, according to the embodiment shown in FIG. 15, preview control can be always made irrespective of the controlled aperture value.

Figure 16:
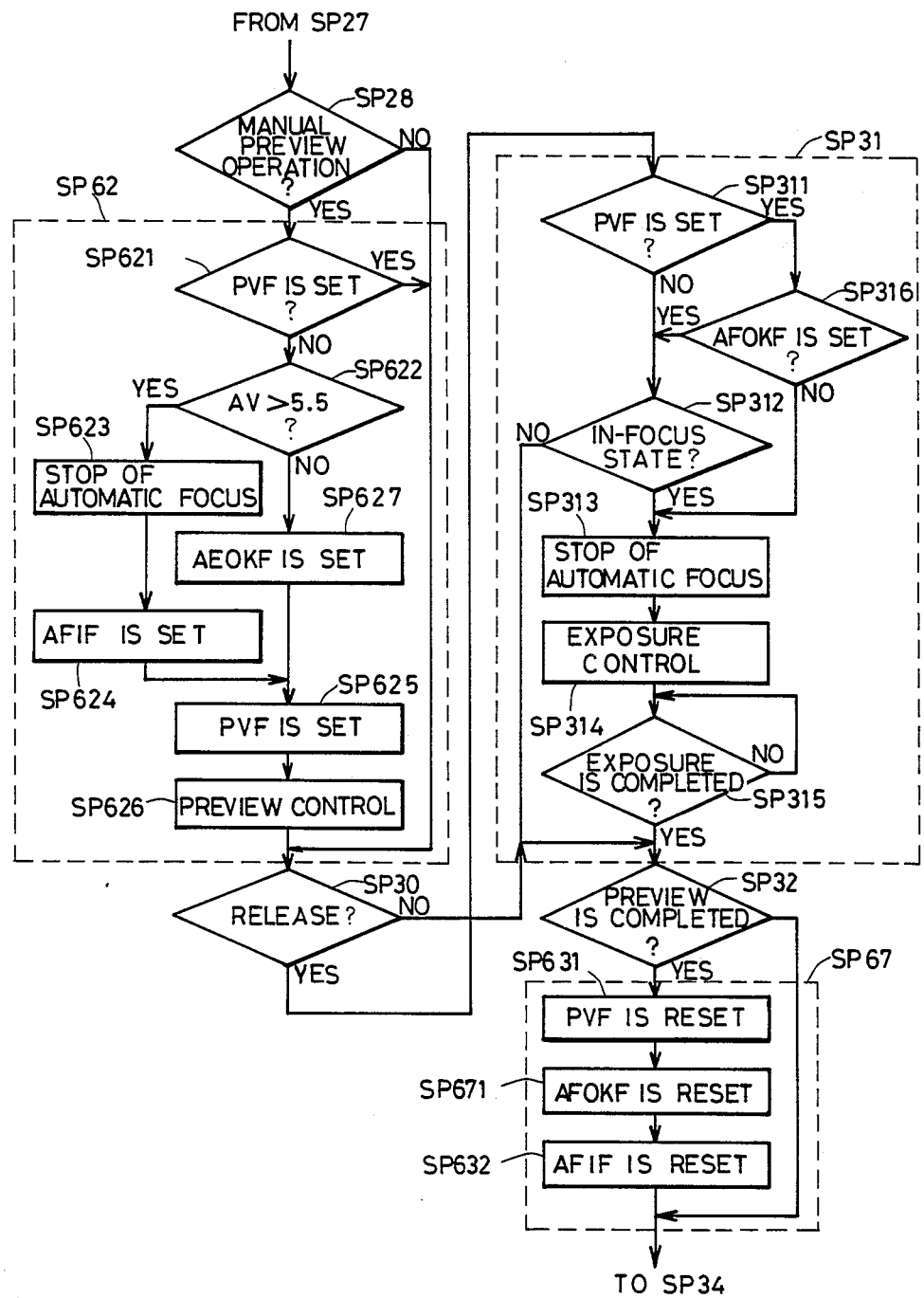
FIG. 16 is a flow chart for explaining operation of a sixth embodiment of the present invention.

FIG. 16 is a flow chart for explaining operation of a sixth embodiment of the present invention. According to the embodiment shown in FIG. 16, in order to permit the shutter release operation after the lens has been brought into the in-focus condition, the automatic focus detection permitting flag AFOKF is adapted to be set in the step SP651 when the controlled aperture value AV is equal to or smaller than 5.5. After the shutter has been released, the microcomputer 1 determines whether the automatic focus detection permitting flag AFOKF is set in the step SP661. If it is set, determination as to in-focus condition is made and if the in-focus condition is not established, release of the shutter is interrupted. The automatic focus detection permitting flag AFOKF may be reset in the step SP671 when the cancellation of the preview control is determined in the step SP32.

In the case of performing the shutter release operation in response to the manual operation in spite of the focusing condition of the lens, the steps SP311, SP312 and SP661 shown in FIG. 16 need to be excluded.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic focus detecting camera comprising:
   detecting means for detecting a focusing condition of an objective lens mounted on said camera by receiving light transmitted through said objective lens;
   aperture determining means for determining a first aperture value of said objective lens to produce a first aperture signal indicative of said first determined aperture value;
   first stopping-down means, including a first operating member operable manually, for stopping down an aperture diaphragm of said objective lens to a diameter corresponding to said first aperture signal in response to an operation of said first operating member for a photographing operation of said camera;
   operating means, including a second operating member operable manually, for producing an operating signal when said second operating member is operated;
   second aperture signal producing means for producing a second aperture signal indicative of a second predetermined aperture value;
   second stopping-down means for stopping down the aperture diaphragm of said objective lens to a diameter corresponding to said first aperture signal in response to said operating signal prior to said photographing operation;
   comparison means for comparing said first aperture signal with said second aperture signal to produce a comparison signal indicative of the compared result; and
   controlling means for controlling operation of said detecting means in accordance with said comparison signal so that the operation of said detecting means is limited when said first aperture value is larger than said second aperture value and that the operation of said detecting means is free from the limitation when said first aperture value is equal to and smaller than said second aperture value.

2. An automatic focus detecting camera as claimed in claim 1, wherein said controlling means includes means for interrupting the operation of said detecting means when said first aperture value is larger than said second aperture value.

3. An automatic focus detecting camera as claimed in claim 2, further comprising means for driving said objective lens in accordance with the detected focusing condition, shutter releasing means for releasing a shutter of said camera in order to start the photographing operation of said camera, and means for controlling said shutter releasing means in accordance with the detected focusing condition, so that the operation of said shutter releasing means is interrupted until an in-focus condition of said objective lens is detected by said detecting means when said detecting means is operated, and that said shutter releasing means is operable independently of the detected focusing condition when the operation of said detecting means is interrupted.

4. An automatic focus detecting camera as claimed in claim 2, further comprising means for driving said objective lens in accordance with the detected focusing condition, shutter releasing means for releasing a shutter of said camera in order to start the photographing operation of said camera, and means for controlling said shutter releasing means in accordance with the detected focusing condition, so that said shutter releasing means is operable when said second stopping-down means is operated and that the operation of said shutter releasing means is interrupted until an in-focus condition of said objective lens is detected by said detecting means when said second stopping-down means is not operated.

5. An automatic focus detecting camera comprising:
    detecting means for detecting a focusing condition of an objective lens mounted on said camera by receiving light transmitted through said objective lens;
    aperture determining means for determining an aperture value of said objective lens to produce in aperture signal indicative of the determined aperture value;
    first stopping-down means for stopping down an aperture diaphragm of said objective lens to a diameter corresponding to said aperture signal for a photographing operation of said camera;
    second stopping-down means for stopping down the aperture diaphragm of said objective lens to a diameter corresponding to said aperture signal prior to the photographing operation of said camera;
    selecting means for selecting either a first mode in which said second stopping-down means is operated in accordance with said aperture signal or a second mode in which said second stopping-down means is not operated;
    determining means, operated when said first mode is selected, for determining whether said detecting means is enabled to detect the focusing condition of said objective lens even if said second stopping-down means is operated to produce a determining signal indicative of the determined result; and
    controlling means, operated when said first mode is selected, for controlling said detecting means in accordance with said determining signal so that said detecting means is permitted to be operated when said determining means determines that said detecting means is enabled to detect the focusing condition of said objective lens even if said second stopping-down means is operated, and that the operation of said detecting means is interrupted when it is determined by said determining means that said detecting means is not enabled to detect the focusing condition of said objective lens.

6. An automatic focus detecting camera as claimed in claim 5, wherein said determining means includes means for determining whether said detecting means is enabled to detect the focusing condition of said objective lens in accordance with the aperture signal.

7. An automatic focus detecting camera comprising:
    detecting means for detecting a focusing condition of an objective lens mounted on said camera by receiving light transmitted through said objective lens;
    aperture determining means for determining an aperture value of said objective lens to produce a first aperture signal indicative of said first determined aperture value;
    first stopping-down means, including a first operating member operable manually, for stopping down an aperture diaphragm of said objective lens to a diameter corresponding to said first aperture signal in response to an operation of said first operating member for a photographing operation of said camera;
    operating means, including a second operating member operable manually, for producing an operating signal when said second operating member is operated;
    second aperture signal producing means for producing a second aperture signal indicative of a second predetermined aperture value;
    second stopping-down means for stopping down an aperture diaphragm of said objective lens to a diameter corresponding to said first aperture signal in response to the operating signal prior to the photographing operation of said camera;
    comparison means for comparing said first aperture signal with said second aperture signal to produce a comparison signal indicative of the compared result; and
    controlling means for controlling operation of both of said second stopping-down means and said detecting means so that said second stopping-down means is operated when the first aperture value is equal to and smaller than the second aperture value while said detecting means is also operated, and that the operation of said second stopping-down means is limited when the first aperture value is larger than the second aperture value while said detecting means is operated.

8. An automatic focus detecting camera as claimed in claim 7, wherein said second aperture signal producing means includes means for producing a second aperture signal corresponding to a maximum aperture value permissible for detecting the focusing condition by said detecting means.

9. An automatic focus detecting camera as claimed in claim 7, wherein said controlling means includes means for operating said second stopping-down means by setting said first aperture value to a maximum aperture value permissible for detecting the focusing condition of said objective lens by said detecting means, when the first aperture value is larger than the second aperture value.

10. An automatic focus detecting camera comprising:
    detecting means for detecting a focusing condition of an objective lens mounted on said camera by receiving light transmitted through said objective lens;

aperture determining means for determining an aperture value of said objective lens to produce an aperture signal indicative of said determined aperture value;

signal producing means, including a first operating member and a second operating member both of which are manually operable, for producing a first operating signal when said first operating member is operated and for producing a second operating signal when said second operating member is operated;

first stopping-down means for stopping down an aperture diaphragm of said objective lens to a diameter corresponding to said aperture signal in response to said first operating signal for a photographing operation of said camera;

second stopping-down means for stopping down the aperture diaphragm of said objective lens to a diameter corresponding to said aperture signal in response to said second operating signal prior to a photographing operation of said camera; and controlling means, operated when said second operating member is operated, for controlling both of said detecting means and said second stopping-down means so that said second stopping-down means is operated after the operation of said detecting means.

11. An automatic focus detecting camera as claimed in claim 10, further comprising determining means for determining whether said detecting means is enabled to detect the focusing condition, and wherein said controlling means includes means for starting the operation of said second stopping-down means without operation of said detecting means when said determining means determines that said detecting means is not enabled to detect the focusing condition of said objective lens.

12. An automatic, focus detecting camera as claimed in claim 11, wherein said determining means includes means for determining that it is impossible for the detecting means to detect the focusing condition of the lens, when the lens is a lens whose focusing condition can not be detected by the detecting means.

13. An automatic focus detecting camera as claimed in claim 10, wherein said controlling means includes means for starting the operation of said second stopping-down means after said detecting means has detected an in-focus condition of said objective lens.

14. An automatic focus detecting camera as claimed in claim 10, wherein said controlling means includes means for operating said determining means while said second stopping-down means is being operated after termination of operation of said detecting means, and means for starting the operation of said second stopping-down means when said determining means determines that said detecting means is not enabled to detect the focusing condition of said objective lens.

15. An automatic focus detecting camera as claimed in claim 10, wherein said controlling means includes time measuring means for measuring a predetermined time period from starting of the operation of said detecting means, and means for starting the operation of said second stopping-down means when measuring of the predetermined time period by said time measuring means is completed without detection of an in-focus condition by said detecting means.

16. An automatic focus detecting camera as claimed in claim 10, wherein said controlling means includes means for starting the operation of said detecting means in response to the operation of said selecting means.

17. An atutomatic focus detecting camera comprising: detecting means for detecting a focusing condition of an objective lens mounted on said camera by receiving light transmitted through said objective lens;

aperture determining means for determining an aperture value of said objective lens to produce an aperture signal indicative of said determined aperture value;

a first operating member which is manually operable;

a second operating member which is manually operable;

signal producing means for producing a first operating signal in response to the operation of said first operating member and for producing a second operating signal in response to the operation of said second operating member;

first stopping-down means for stopping down an aperture diaphgram of said objective lens to a diameter corresponding to said aperture signal in response to said first operating signal for a photographing operation of said camera;

second stopping-down means for stopping down the aperture diaphragm of said objective lens to a diameter corresponding to said aperture signal in response to said second operating signal prior to a photographing operation of sais camera; and starting means for starting a photography-preparing operation of said camera, including at last focusing operation of said objective lens, in response to the operation of said second operating member.

18. An automatic focus detecting camera as claimed in claim 17, wherein said starting means includes means for starting the operation of said detecting means.

* * * * *